United States Patent [19]

Johnston et al.

[11] Patent Number: 4,995,646

[45] Date of Patent: Feb. 26, 1991

[54] CONNECTOR FOR MULTIPLE LINES

[75] Inventors: Lonnie E. Johnston, Bedford, Ohio; Peter C. Homan, Jupiter, Fla.

[73] Assignee: Crawford Fitting Company, Solon, Ohio

[21] Appl. No.: 441,991

[22] Filed: Nov. 28, 1989

[51] Int. Cl.[5] .............................................. F16L 39/00

[52] U.S. Cl. ............................... 285/137.1; 285/382.7

[58] Field of Search ..................... 285/132, 137.1, 354, 285/382.7

[56] References Cited

U.S. PATENT DOCUMENTS

| | | | |
|---|---|---|---|
| 2,438,679 | 3/1948 | Parker | 285/137.1 |
| 3,394,761 | 7/1968 | Jackson, Jr. et al. | 285/137.1 |
| 3,948,315 | 4/1976 | Powell | 285/137.1 X |
| 4,667,987 | 5/1987 | Knebel | 285/137.1 |

FOREIGN PATENT DOCUMENTS

| | | | |
|---|---|---|---|
| 2018867 | 10/1971 | Fed. Rep. of Germany | 285/137 R |
| 957909 | 5/1964 | United Kingdom | 285/137.1 |
| 1164335 | 2/1967 | United Kingdom | 285/137 R |

*Primary Examiner*—Eric K. Nicholson

[57] ABSTRACT

A connector assembly for permitting sealed passage of tubular lines through portions between separate chambers comprises a first fitting body having a through passage for connection to one of the chambers. The through passage has an outwardly open end with a circumferentially continuous conical mouth. A first rigid disk member with a conical outer surface is received in the conical mouth. Aligned with the first disk member is a second disk member and there are aligned openings formed through both disk members to permit the tubular lines to pass therethrough. Conical chambers are formed about the openings in the first disk member with ferrules positioned therein to closely encircle the tubular lines. A coupling acts to drive the second disk toward the first disk to drive said ferrules into the conical chambers to thereby produce sealing of the ferrules with the lines and to apply force to the first disk to produce sealing between the first disk and the conical mouth.

11 Claims, 2 Drawing Sheets

CONNECTOR FOR MULTIPLE LINES

BACKGROUND OF THE INVENTION

The subject invention is directed toward the art of pipe joints and couplings and, more particularly, to a connector device for allowing a plurality of tubular members to pass through a wall or partition in sealed relationship.

In many fluid flow systems, as well as in various sensing and control environments, it is often necessary to pass a multiple number of tubular members such as flow lines, probes and sensors through walls and other partitions between sealed chambers. The tubular members are frequently of relatively small diameter and must often be in closely spaced multiples.

The problems encountered in ensuring liquid and gas tight seals about such tubular members at the locations where they pass through partitions and walls between separate sealed chambers are significant. The problems increase drastically in high temperature and high pressure environments.

One of the more common types of connectors used for the purpose discussed, relies on compression glands formed of a variety of different materials depending upon the pressures and temperatures to be encountered. For example, lava rock glands are sometimes used for high temperature and high pressure ambient environments. Other less exotic materials are used for the glands when the operating conditions are less severe. In any event, these prior connectors are expensive and suffer from a variety of disadvantages. Some of the disadvantages include their relatively high cost, high make-up torque, slow and often complicated make-up, and an inability to be re-made after disassembly. Accordingly, a distinct need exists for a simplified and improved connector for the purposes discussed.

BRIEF STATEMENT OF THE INVENTION

According to the subject invention, there is provided a connector assembly for permitting sealed passage of tubular lines through a wall or other partition. The connector assembly comprises a first fitting body having a through passage for connection to the partition with the through passage having an outwardly open end with a circumferentially continuous conical mouth. A first rigid disk member with an outer surface to sealingly engage the conical mouth is received therein. A second rigid disk member is aligned with the first disk member and aligned openings are formed through both the first and second disk member. The openings are sized so as to each freely receive one of the tubular lines to allow the lines to pass therethrough. About the openings in the first disk member, there are conical chambers with ferrules in the conical chambers which are sized to closely encircle the tubular lines passing therethrough. Nut means are threadedly joined to the first fitting body for driving the second member toward the first disk member to thereby drive the ferrules into the conical chambers to produce sealing engagement of the ferrules with the tubular lines and to apply force to the first disk member to produce sealing between the conical surface of the first disk and the mouth.

Preferably, and in accordance with a more limited aspect of the invention, there are two cooperating and aligned ferrules in each of the conical chambers. Additionally, the nut means preferably comprises a female nut which is threadedly received on the exterior of the first fitting body and includes a radially inwardly extending shoulder for circumferentially engaging the second disk member.

In accordance with a further and more limited aspect, the first disk member includes a cylindrical section which is guided by a cylindrical portion of the first body inward of the conical mouth.

The connector according to the invention can rely upon well known relationships between the various ferrule and the conical chambers to produce extremely effective seals relative to the tubular lines. The connectors formed according to the invention can be disassembled and reassembled without loss of sealing effectiveness. Moreover, the ferrules can be made in a variety of materials to suit system operating conditions and environments. In most instances, however, standard stainless steel ferrules can be used throughout a wide range of temperature and pressure conditions.

Accordingly, a primary object of the invention is for provision of a connector assembly which allows multiple lines to pass in sealing relationship through walls, panels and the like.

A further object of the invention is the provision of a connector of the type described which uses standard ferrule type tubing connectors to perform a sealing function.

Yet another object of the invention is the provision of a connector of the type described which is simple to install and highly reliable in operation.

Yet another object is the provision of a connector of the type described which permits a multiple number of small tubular members to be individually sealed when they pass through a single relatively small opening

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
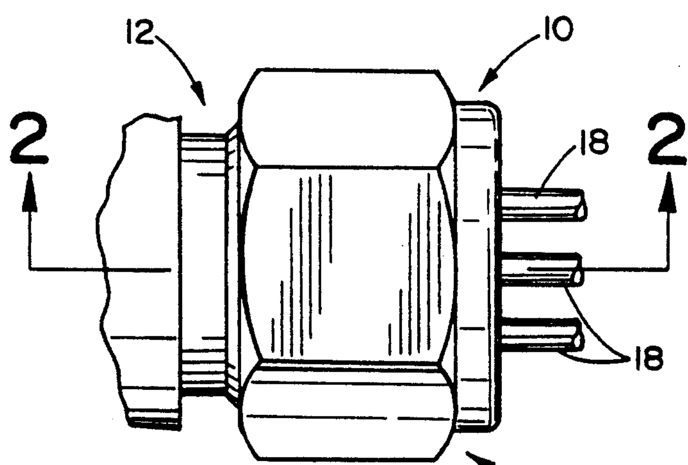
FIG. 1 is a side elevational view of a connector assembly formed in accordance with a preferred embodiment of the subject invention.
Figure 2:
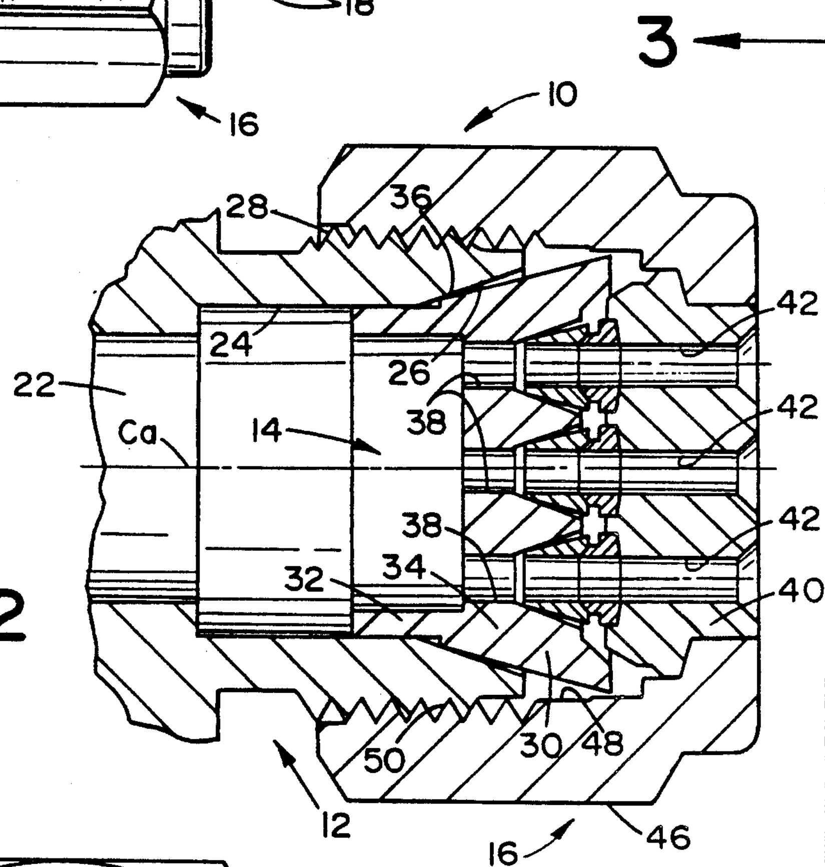
FIG. 2 is an enlarged cross-sectional view taken on line 2—2 and showing the connector prior to installation and sealing of the tubular through lines.

Referring more particularly to the drawings wherein the shoWings are for the purpose of illustrating a preferred embodiment of the invention only, and not for the purpose of limiting same, FIGS. 1 and 2 show the overall arrangement of the connector 10 comprising a main connector body 12 which receives the sealing disk and ferrule assembly 14 and a coupling nut member 16. The connector arrangement is designed so that a plurality of elongated tubular members 18 can be conducted therethrough to allow their passage in sealed relationship between separate chambers. The tubular members 18 can be fluid lines, probes, sensing elements or the like. The main coupling body element 12 is shown only partially since it could constitute a portion of a chamber, panel, or a tube fitting extending from a wall or the like. In any event, the main coupling body element 12 comprises a rigid body 20 normally formed of a suitable metal such as stainless steel having an internal passage 22 which connects with one of the chambers between which the tubular members are to be conducted in sealed relationship.

As best shown in FIG. 2, the passage 22 terminates in a cylindrical chamber 24 having an outwardly open, generally conically shaped mouth 26. Suitable external connecting threads 28 are formed circumferentially about the body 20 of the conical mouth 26. Although as will become apparent, the angle of the conical mouth 26 can vary, in the subject embodiment, it is preferably inclined at an angle of approximately 20° relative to the central axis $C_a$.

Figure 4:
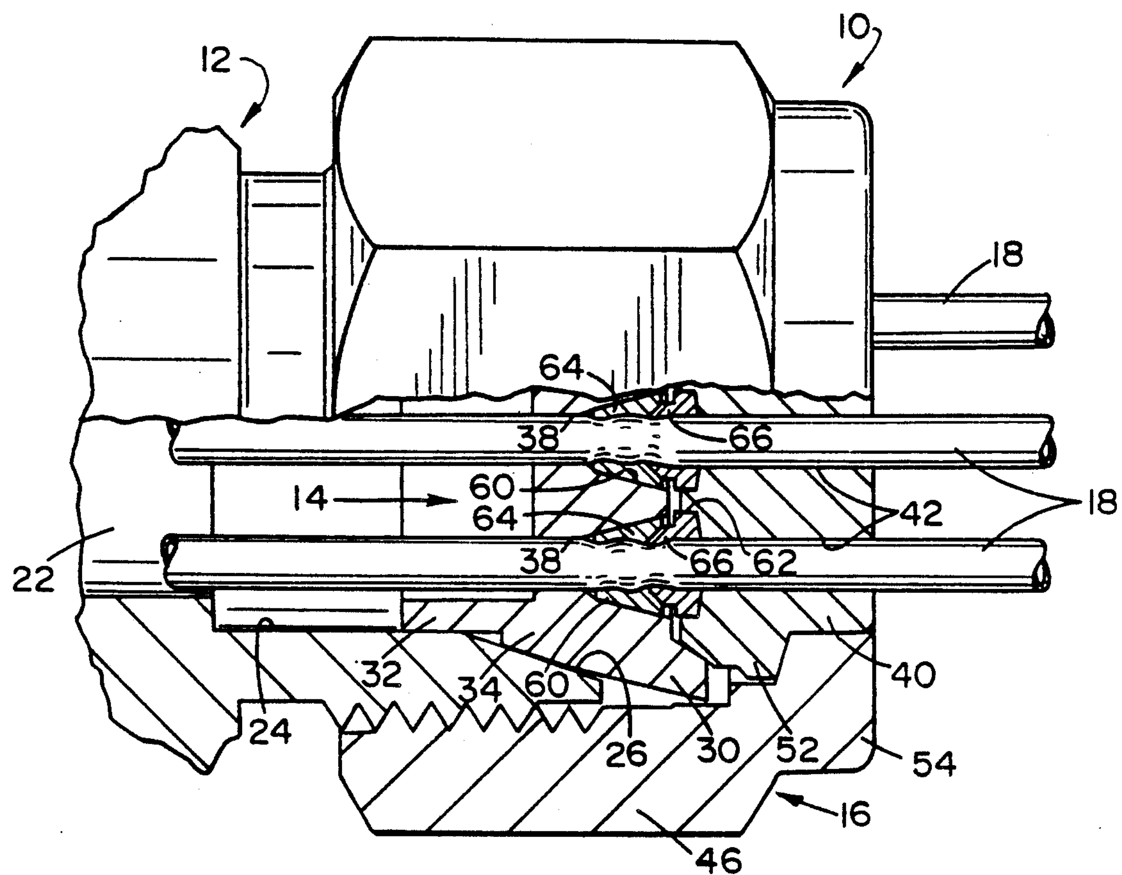
FIG. 4 is a partial sectional view similar to FIG. 2 showing the connector in a made-up condition with the tubular members sealed therein; and, FIG. 5 is an exploded pictorial view of the disk and ferrule components of the connector.
Figure 5:
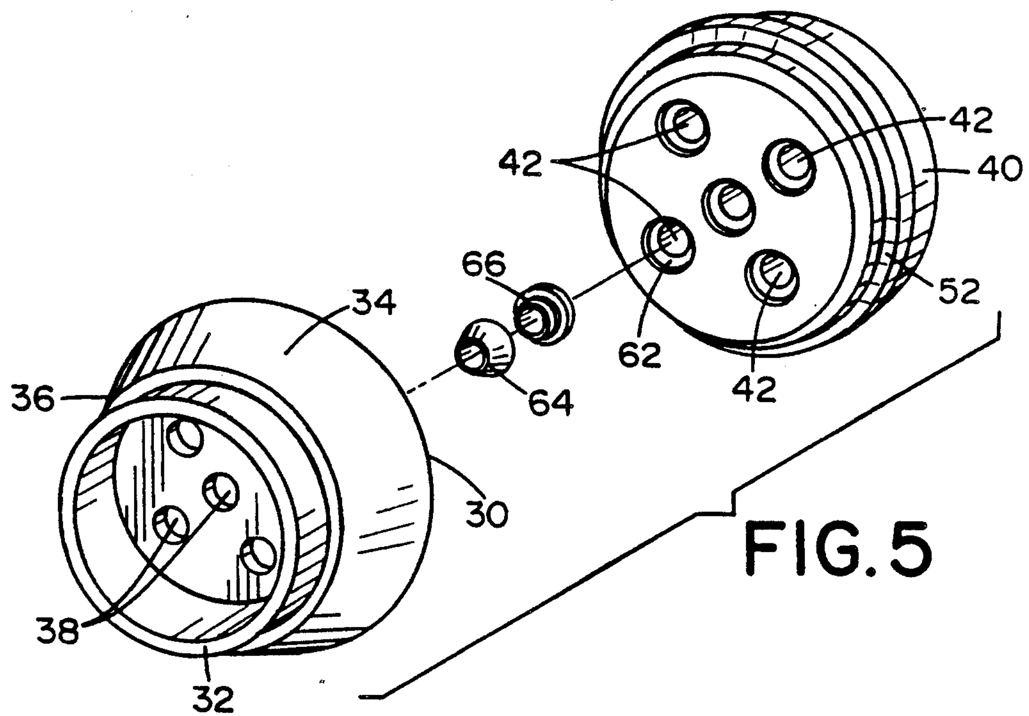

Adapted to be received within the mouth 26 of the main coupling body member 12 is a first rigid disk member 30. As best illustrated in FIGS. 2, 4, and 5, the first rigid disk member 30 includes a generally cylindrical section 32 which is sized so as to be freely but closely received within the cylindrical portion 24 of passage 22. This functions to guide the disk to maintain it properly oriented relative to the mouth 26. Connected with the cylindrical portion 32 is a truncated conical section 34 which flares outwardly at an angle relative to central axis $C_a$ which is slightly less than the angle of the conical mouth 26. The minimum inner diameter of the conical portion 34 is slightly more than the minimum inner diameter of the conical mouth 26. Consequently, when the first disk member 30 is positioned in the mouth 26 as shown, a sealing contact band 36 is formed continuously about the disk member 30.

Figure 3:
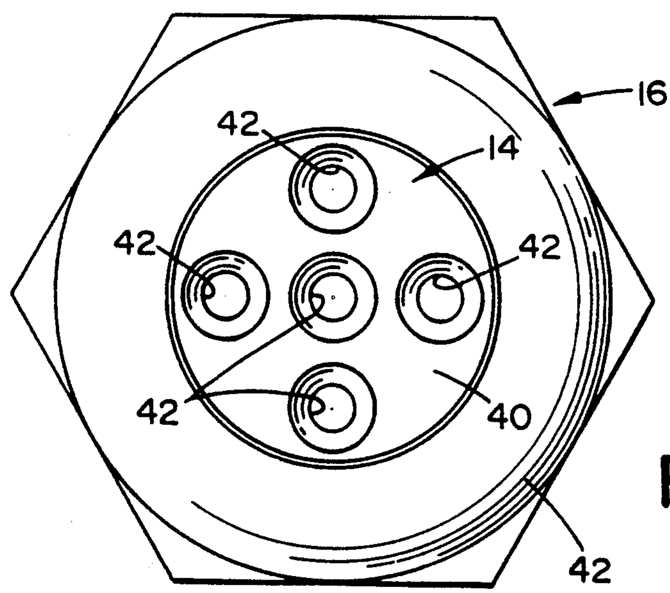
FIG. 3 is an end view taken on line 3—3 of FIG. 2.

Extending through disk member 30 are a number of openings 38 corresponding to the maximum number of lines intended to be passed through the connector assembly 10. As shown in FIG. 3, the subject embodiment provides five openings 38 which are laid out in the regular pattern illustrated. As will become apparent, the actual number of openings 38 provided in the first disk member 30 could of course vary widely. Additionally, it will be understood that certain of the openings could be plugged or fitted with a short section of tubular member. That is, it is not necessary that each opening be used to conduct a tubular member into the chamber connected with through passage 22. Additionally, while it is preferred that the openings be regularly spaced and uniformly located on the disk member 30, variations in the pattern could occur.

Referring again to FIGS. 2, 4, and 5 it will be noted that a second disk member 40 is positioned in generally parallel and aligned relationship with the disk member 30. The second disk member 40 is likewise provided with a plurality of through openings 42 which correspond to the layout of the openings 38 in the first disk member 30. Preferably, the openings 38 of disk member 30 and the openings 42 in the second disk member 40 are of generally corresponding size with a diameter only slightly greater than the external diameter of the tubular members 18 that are to be passed through the connector.

The second disk member 40 is maintained in the position illustrated in FIGS. 2 and 4 and is adapted to be driven toward the first disk member 30 by a coupling nut member 46 which has an internal cylindrical opening 48 provided with threads 50 which cooperate with external threads 28 on the body 20. As shown, the disk member 40 is provided with an outwardly extending shoulder portion 52 which is engaged by a radially inwardly extending shoulder portion 54 formed about the right hand end of the coupling nut member 46. The reduced diameter right hand end portion of the second disk member 40 is closely received within the open end of the coupling nut 46 in the manner illustrated.

Of particular importance to the subject invention is the relationship between the first disk member 30 and the second disk member 40 with respect to the ferrule enclosing chambers defined therebetween. More particularly, as best illustrated in FIGS. 2, 4 and 5, a generally conical ferrule received chamber 60 is formed about the right hand end of each opening 38 in the first disk member 30. Preferably, aligned with the conical chamber portion 60 is a recess 62 formed inwardly about the left hand end of opening 42 in the disk 40. This opening 62 is arranged in alignment with the corresponding chamber 60 to define a ferrule receiving chamber which carries a pair of cooperating ferrule members 64 and 66. The ferrule 64 and 66 are of standard design and could be, for example, built to the shape and dimensional relationships illustrated in the prior, U.S. Pat. Nos. 4,076,286 and 3,103,373. In any event, the forward ferrule 64 is provided with an external taper which generally corresponds to the taper of the conical mouth 60. The rear or outwardly facing end of each ferrule 64 is provided with a conical, steeply tapered portion which receives the nose of the rear ferrule 66 in the manner illustrated in FIG. 2.

When the components are loosely assembled as shown in FIG. 2, the individual tubular members 18 can be passed through the openings 42, 38 and the ferrules positioned therein to the located position shown in FIG. 4. Thereafter, the nut member 46 can be tightened onto the threads 28 of the first coupling body component 20. During this tightening the second disk member 40 is driven toward the first disk member 30 causing the ferrules 64, 66 to be swaged into engagement with the external surface of the tubular members 18 and simultaneously brought into fluid and gas tight sealing engagement with the mouth 60 of each individual opening 38. Simultaneously with this swaging of the ferrules into sealing engagement with the tubular members 18, the first disk member 30 is driven into sealing engagement with the mouth 26 on passageway 22. Thus, by tightening the single coupling nut 46 a seal is provided about each of the tubular members 18 and the first disk member 30.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A connector assembly for permitting sealed passage of tubular lines through a first passage, said connector assembly comprising, a first fitting body having a through passage for connection to said first passage, said through passage having an outwardly open end with a circumferentially continuous conical mouth;

a first rigid disk member having a conical outer surface received in said conical mouth;

a second rigid disk member aligned with said first disk member;

aligned openings formed through each of said first and second disk members, said openings sized to freely receive said tubular lines;

conical chambers formed about the openings in said first disk member;

ferrules in said conical chambers sized to closely encircle the tubular lines passing therethrough; and, nut means for driving said second disk toward said first disk to drive said ferrules into said conical chambers to thereby produce sealing of said ferrules with said lines and to apply force to said first disk to produce sealing between the conical outer surface of said first disk and said conical mouth.

2. The connector assembly as defined in claim 1 wherein there are two aligned ferrules in each said conical chamber.

3. The connector assembly as defined in claim 1 wherein said nut means is threadedly connected to said first fitting body.

4. The connector assembly as defined in claim 1 wherein said first and second disk members are generally parallel and said nut means includes an opening which receives said second disk member.

5. The connector assembly as defined in claim 1 wherein each said conical chamber opens toward said second disk and wherein said second disk includes a recess aligned with each said conical chamber.

6. A connector assembly for permitting sealed passage of tubular members through a wall comprising:

a first fitting body adapted for connection to said wall and having a passage therethrough with an outwardly open circular mouth;

a first rigid disk member received in said mouth and including a circumferentially continuous surface for sealing with said mouth when driven toward said passage, a plurality of openings formed through said first rigid disk member for permitting free access of said tubular members through said disk and into said passage;

each said opening formed through said first rigid disk member including a conical chamber formed at the entrance thereto;

ferrule means in each conical chamber for producing a seal between said first rigid disk member and the tubular member passing through its respective conical chamber when each respective ferrule means is driven into its respective conical chamber; and clamping means including a second rigid disk member for driving said ferrule means into said conical chambers and driving said first rigid disk into said outwardly open circular mouth.

7. The connector assembly as defined in claim 6 wherein said clamping means further includes a nut member threadedly connected to said first fitting body.

8. The connector assembly as defined in claim 7 wherein said second rigid disk member is carried by said nut member.

9. The connector assembly as defined in claim 8 wherein said second rigid disk member includes openings aligned with said openings in said first disk and wherein said ferrule means comprises a pair of aligned ferrules in each said conical chamber.

10. A connector assembly as defined in claim 8 wherein said second rigid disk member is provided with openings aligned with said openings in said first rigid disk and recesses about each said second disk opening in alignment with the conical chamber about the entrance to the associated opening in said first disk.

11. A connector assembly for permitting sealed passage of tubular members through a wall comprising:

a first fitting body adapted for connection to said wall and having a passage therethrough with an outwardly open circular mouth;

a first rigid disk member received in said mouth and including a circumferentially continuous surface for sealing with said mouth when driven toward said passage, a plurality of openings formed through said first rigid disk member for permitting free access of said tubular members through said disk and into said passage;

each said opening formed through said first rigid disk member including a conical chamber formed at the entrance thereto;

ferrule means in each conical chamber for producing a seal between said first rigid disk member and the tubular member passing through its respective conical chamber when each respective ferrule means is driven into its respective conical chamber; and clamping means for driving said ferrule means into said conical chambers and driving said first rigid disk into said outwardly open circular mouth.

* * * * *